United States Patent [19]
Bose

[11] Patent Number: 6,059,835
[45] Date of Patent: May 9, 2000

[54] PERFORMANCE EVALUATION OF PROCESSOR OPERATION USING TRACE PRE-PROCESSING

[75] Inventor: Pradip Bose, Yorktown Heights, N.Y.

[73] Assignee: International Business Machines Corporation, Armonk, N.Y.

[21] Appl. No.: 08/876,160

[22] Filed: Jun. 13, 1997

[51] Int. Cl.⁷ .................................................. G06F 17/50
[52] U.S. Cl. ................................. 703/19; 702/186; 703/21
[58] Field of Search ................................. 395/500, 500.4; 364/578, 488, 489, 490, 491; 714/1, 6, 47; 702/182, 183, 184, 185, 186

[56] References Cited

U.S. PATENT DOCUMENTS

| | | | |
|---|---|---|---|
| 4,901,260 | 2/1990 | Lubachevsky | 364/578 |
| 5,303,166 | 4/1994 | Amalfitano et al. | 702/186 |
| 5,371,689 | 12/1994 | Tatsuma | 702/186 |
| 5,548,539 | 8/1996 | Vlach et al. | 364/578 |
| 5,615,357 | 3/1997 | Ball | 395/500.42 |
| 5,671,402 | 9/1997 | Nasu et al. | 395/568 |
| 5,696,942 | 12/1997 | Palnitkar et al. | 395/500 |
| 5,752,002 | 5/1998 | Naidu et al. | 395/500 |
| 5,809,450 | 9/1998 | Chrysos et al. | 702/186 |
| 5,848,262 | 12/1998 | Burch | 395/500 |

OTHER PUBLICATIONS

S. Surya et al., Architectural performance verification: PowerPC processors, Computer Design, 1994, VLSI in Computers and Processors, ICCD '94, IEEE Int'l Conference, pp. 344–347.

P. Bose, Architectural Timing Verification and Test for Super Scalar Processors, Fault–Tolerant Computing, 1994, FTCS–24, Digest of Papers, 24th Int'l Symposium, pp. 256–265.

Iyengar et al., Representative Traces for Processor Models with Infinite Cache, High–Performance Computer Architecture, 1996, 2nd Int'l Symposium, pp. 62–72.

*Primary Examiner*—Kevin Teska
*Assistant Examiner*—Russell W. Frejd
*Attorney, Agent, or Firm*—Kelly K. Kordzik; Winstead Sechrest & Minick P.C.; Anthony V. S. England

[57] ABSTRACT

A processor performance evaluation system and method provides a method of model decomposition and trace attribution by first decomposing a full pipelined model of the entire system into a main model and one or more additional sub-models, such that it is possible to build fast trace-driven non-pipelined simulation models for the sub-models to compute specific metrics or values, which would be required during full-model, pipeline simulation. The main model is a fully pipelined model of the entire system; however, the simulation work required for the sub-units characterized by the sub-models is not coded into the simulation engine. Instead, the necessary values are provided from encoded fields within the input trace.

18 Claims, 7 Drawing Sheets

PERFORMANCE EVALUATION OF PROCESSOR OPERATION USING TRACE PRE-PROCESSING

TECHNICAL FIELD

The present invention relates in general to pre- and post-silicon performance evaluation of microprocessors and microprocessor-based systems, and in particular to simulation-based analysis of such systems.

BACKGROUND INFORMATION

Trace-driven, cycle-based simulation is a popular methodology used for architectural performance evaluation of microprocessors and microprocessor-based systems. Such a methodology can estimate benchmark program performance years before actual hardware is available. It also enables designers to understand, analyze and selectively remove the performance bottlenecks in the target microarchitecture.

A problem with such simulation-based methodologies is that the input workload "trace" can be millions or even billions of instructions long, and the speed of simulating the full processor-memory sub-system is often low enough that it could take weeks (or even months) to evaluate a single design point for a single workload. Given that in a processor development environment, analysis results across an entire suite of workloads are needed on at least a weekly basis, it is apparent that the state of the art in trace-driven architectural simulation is quickly becoming inadequate in meeting the demands of increasingly complex microprocessor designs.

In cycle-based simulation, each pipelined resource (i.e., functional unit, cache/memory access, bus transaction, queues/buffers, etc.) is serviced during every simulated cycle of the target processor. A common term used for such a software cycle-by-cycle simulation program is: "timer". (Henceforth, in this document, the terms "timer" and "cycle-based processor simulation program" shall be used interchangeably.) Since the detailed instruction flow through all concurrent, pipelined resources is modeled in a timer, the simulation speed is inversely related to the complexity and detail of the model; this complexity is approximately proportional to the maximum number of outstanding instructions (and hence distinct pipeline and buffer stages) supported by the microprocessor system (as modeled in the timer) on a given machine cycle. Also, the total simulation cost (time) increases with the length of the trace. In other words, the total simulation cost C is the product of the average simulation speed (rate) S, measured in seconds/instruction, and the trace length, measured in instructions. If the trace is encoded in binary form to save disk space on the simulation host machine, the speed S may be measured in seconds/byte, and the trace length is then expressed in bytes. The complexity of the model also depends on the amount of work (which can be measured in number of host machine instructions executed) needed to be done for processing an instruction passing through a given pipeline or buffer stage. Thus, not all stages require an equal amount of simulation work; so a simple count of the total number of stages is not enough. A weighted sum of the number of stages, where each weight gives a measure of the simulation work needed for that stage, would give a better measure of the worst-case model complexity.

As such, there is a need in the art for reducing the simulation cost (time) for a given workload trace.

SUMMARY OF THE INVENTION

One way to address the foregoing need is to improve upon the methodology such that the native speed of cycle-based simulation is improved. This invention discloses a method of accomplishing this by reducing the "weights" of selected pipeline simulation stages via one-time trace-preprocessing to add model-specific attributes to the trace file.

The problem addressed is that of fast and accurate, trace-driven performance evaluation of a high-end processor-memory system. In particular, consider the problem of predicting pre-hardware cycles-per-instruction (CPI) performance of a system composed of a super-scalar, RISC (reduced instruction set computing) core processor coupled to a multi-level memory hierarchy. Each sub-system, namely the core processor and the L1-L2-L3 (level-1, level-2, level-3) cache/memory hierarchy is conceptually a complex, pipelined instruction processing model, with concurrent execution modes. The data memory hierarchy sub-system sees only the load and store requests forwarded by the central processing unit (CPU); the core CPU processes the input instructions, fetched from the instruction memory.

Without relevant loss of generality, the particular organization of the memory hierarchy considered here is: unified (instruction and data) L1 cache, unified L2 cache, and infinite L3 (memory). The exact cache geometries (line size, associativity, number of congruence classes) for caches at each level are parameters in the model of the present invention. An "exact" trace-driven timer would model the entire processor-memory system as a single, connected pipeline model, including all the interface logic, queues, interconnection bus stages, etc., to the desired level of accuracy and detail. Within the limits of trace completeness and modeling assumptions, it is possible in principle to architect a very accurate system timer along these lines. However, with the complexities of a typical high-end processor-memory complex (e.g. based on PowerPC 604, 620, etc. processors), there are two main problems with such pre-hardware timer models:

(1) Model complexity, which determines simulation speed (rate); it also has a direct impact on the complexity of model validation and on the cost of model maintenance.

(2) Simulation cost (time) limitations in processing very long benchmark traces.

This invention describes a new method of model decomposition and trace attribution, which reduces the total simulation cost. The cost reduction is effected by using the following high-level procedure:

1. Decompose the full pipelined model (with buffers), M, of the entire system into a main model $M_{main}$ and k additional ($k \geq 1$) sub-models $M_1, M_2, \ldots, M_k$ such that it is possible to build fast trace-driven, "non-pipelined" simulation models for $M_1$ through $M_k$, to compute specific metrics or values which would be required during full-model, pipelined simulation. The main model $M_{main}$ is a fully pipelined model of the entire system, like the original model M; however, the simulation work required for the sub-units characterized by the sub-models $M_1$ through $M_k$ is not coded into the simulation engine; the necessary values are "looked up" from encoded fields within the input trace itself, which has been modified a-priori by the following step.

2. Each non-pipelined simulation sub-model $M_1$ through $M_k$ is invoked separately to process a given workload trace, T, in its original (typically, binary encoded) form. In general, each such sub-model $M_i$ computes a value $V_{ij}$ for each instruction j within the trace T. (Note that $V_{ij}$ may be defined or valid only for a class of instructions within the trace.) The produced values, when valid, are encoded into the particular instruction record within the trace. (Typically, each binary-encoded instruction within a trace has many unused bits, which may be used for encoding the said values, $V_{ij}$.) Thus, k initial fast (non-pipelined) simulation runs are needed for the trace T, to compute and encode the value attributes $V_{ij}$ as above.

An exact pipelined simulation model (such as M or $M_{main}$) capable of cycle-by-cycle representation of the state of the machine, with exact cycle time-stamps on individual instructions flowing through the model, is referred to as a "timer" model. A non-pipelined simulation model (such as $M_i$, i=1, 2, . . . , k), which processes a sequential instruction trace and outputs a sequence of attributes (or values) corresponding to instructions of interest to that model, will be referred to simply as a "simulation" model.

If it is possible to do the sub-model partitioning such that the value attributes $V_{ij}$ are independent of the exact cycle "time-stamps" of the instructions j in the full model M, then the total execution time computed by the main model $M_{main}$ in processing the attributed trace will be identical to that computed by the original full model M. If the above "time-stamp independence" assumption is not valid, the execution time predicted by the new method will still provide a very good estimate of the true execution time, if the model partitioning has been done properly, as explained later.

An advantage of this invention is that because the original trace is processed and attributed once through each sub-model $M_i$ and then processed many times (relatively "cheaply") through the main model $M_{main}$ for system evaluation under parametric variations of the core model, the overall simulation cost is drastically reduced. The disclosed methodology is analogous to the case of program execution on a computer: instead of directly interpreting a high-level language, a more space-time efficient approach is to translate (compile) it once into machine language, followed by multiple, fast executions for various data sets.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3 through 6B illustrate further embodiments of the present invention.

DETAILED DESCRIPTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The process and methodology embodied in this invention shall be described by considering a simple sub-model partitioning, in which the number of sub-models k is equal to 1. In particular, for illustration purposes, consider a system consisting of a super-scalar processor with a finite, unified cache and (an effectively) infinite (perfect) main memory. In accordance with the present invention, the pipelined system model M will be re-modeled as a main system model $M_{main}$ and a single sub-model $M_1$, consisting of the cache/memory sub-system.

Figure 1:
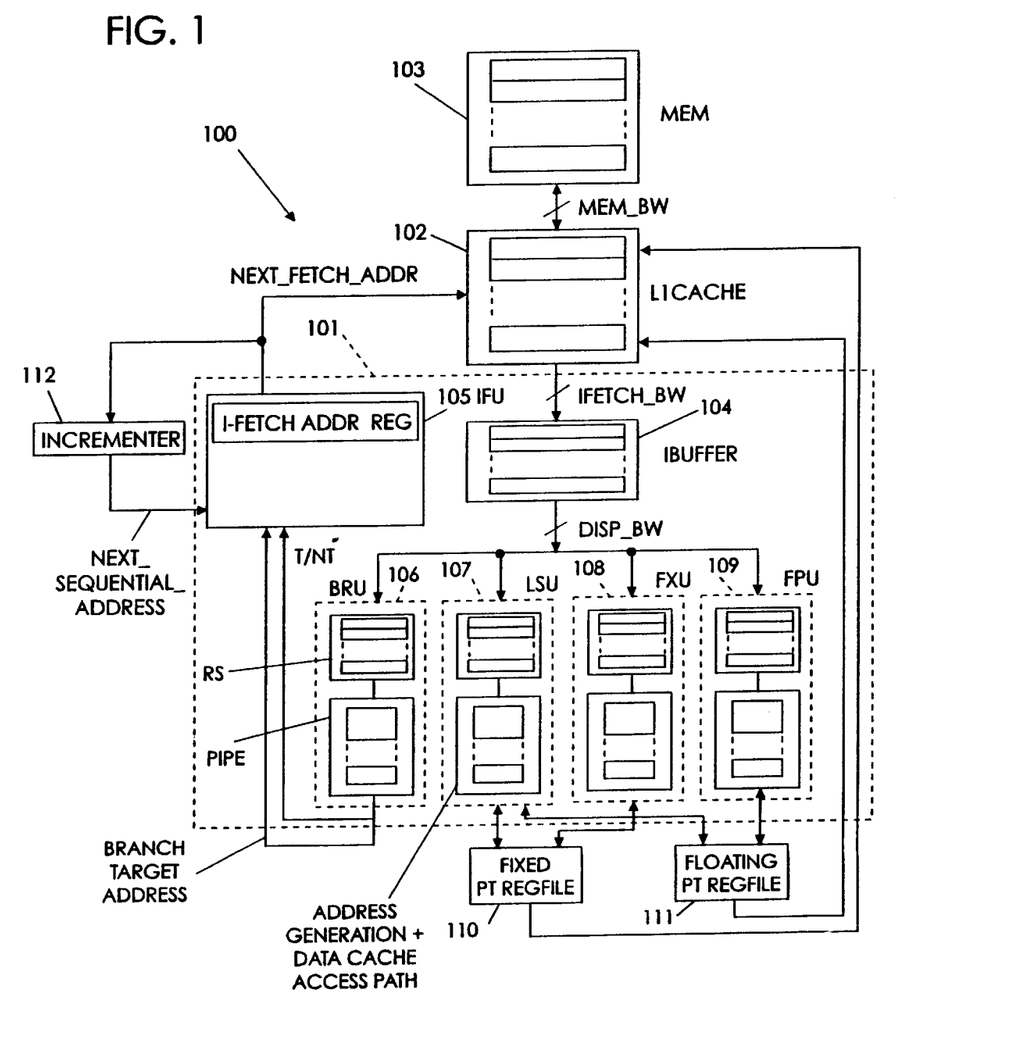
FIG. 1 illustrates a data processing system configured in accordance with the present invention.

Referring to FIG. 1, there is illustrated a basic super-scalar processor pipeline model 100, consisting of the core central processing unit (CPU) 101, the on-chip unified (i.e., combined instruction and data) cache (L1CACHE) 102, and the off-chip memory model (MEM) 103. The CPU 101, L1CACHE 102, and MEM 103 are individually represented as pipeline models. Each pipeline stage corresponds to a machine cycle-level granule of work performed in the machine and hence in the timer model.

Instructions are fetched from the L1CACHE 102 into the instruction buffer IBUFFER 104, the fetch bandwidth being a model parameter ifetch_bw. Instructions are dispatched (bandwidth: disp_bw) in program order to the functional units: branch unit (BRU) 106, load-store unit (LSU) 107, fixed point unit (FXU) 108, floating point unit (FPU) 109. Each functional unit has an associated reservation station (RS) and the actual functional pipe (PIPE). (Note that in general there could be multiple pipes of the same type, being fed by a given RS; only one PIPE per RS is shown for simplicity.) The pipe for LSU 107 includes processing for address generation/translation as well as data cache access to fetch or store operands. A given reservation station (RS) could be an in-order queue, or it could support out-of-order scheduling of instructions; this is specified by a configuration parameter in the implemented timer model.

The LSU 107 and the FXU 108 generate results which update the fixed point register file 110; the LSU 107 and FPU 109 generate results which update the floating point register file 111. The fixed point register file 110 and the floating point register file 111 also act as sources for operands used by the instructions waiting for execution in the reservation stations of the various functional units. The BRU 106 processes branch instructions, which are dependent on the condition register (not shown explicitly in FIG. 1), which may be modified by instructions processed by the FXU 108 or FPU 109.

The BRU 106 generates the target address of a taken branch, along with a prediction or resolution (taken/not taken or T/NT) signal. The instruction fetch unit (IFU) 105 selects either the "next_sequential_address" or the branch target address, (depending on the T/NT signal) in setting the contents of the instruction fetch address register within the IFU 105. The IFU 105 produces the "next_fetch_address" which is used to access the instruction cache (L1CACHE) 102. The next_fetch_address goes through an incrementer 112, which generates the next_sequential_address.

Processor model 100 is a simplified representative of what could be any known processor/memory system (e.g., a PowerPC uniprocessor system made by IBM). Assume in the following (without loss of generality) that the underlying instruction set architecture (ISA) of the modeled machine is of the "load-store" type, like the PowerPC ISA. That is, each instruction of the processor is either a memory reference instruction (LOAD or STORE) in which a processor register is loaded into or stored from; or, it is a functional operation, involving implicit and explicit data operands available in the processor registers alone.

There are four main facets of this invention, in the context of the example sub-model partitioning: the main (core) CPU pipelined timer model $M_{main}$ and the simulation sub-model $M_1$, which models the cache/memory subsystem. ($M_1$ processes the input trace and reports cache "hit/miss" values for load and store instructions only.)

1. Decoupling of the main (core) CPU timer model, $M_{main}$ from the cache/memory hierarchy model. $M_{main}$ models the exact pipeline paths for all instructions, including loads/stores under all categories of hit/miss scenarios. (The actual cache simulation work, e.g., array hit/miss simulation, array access, line replacement, cast-out, etc. are not coded into this model.)
2. Pre-instrumenting the input instruction trace (using a separate fast cache/memory hierarchy simulator $M_1$) by adding an attribute field for load/store instructions, to mark them in accordance with their particular hit/miss outcomes. This is referred to as the "attributed" trace.
3. Using the attributed trace to drive the new (simplified) CPU timer model $M_{main}$ to obtain the finite cache CPI (cycle-per-instruction) performance at infinite-cache timer speed.
4. Using the process in item 3 to emit a CPU timer-generated "time-stamped" (t-stamped), compact load/store trace. This t-stamped load/store instruction trace is used by a standalone, fully pipelined cache/memory hierarchy timer for cache/memory specific trade-offs, and validation of finite cache CPI deltas and hit/miss attributes.

The distinction between the terms simulator and timer used in items 2 and 4 above, respectively, should be noted. A cache/memory hierarchy "simulator" is a relatively fast program, which provides hit/miss information only, without maintaining a pipeline model to simulate cycle-by-cycle behavior, as typified by "timer" programs.

Figure 2:
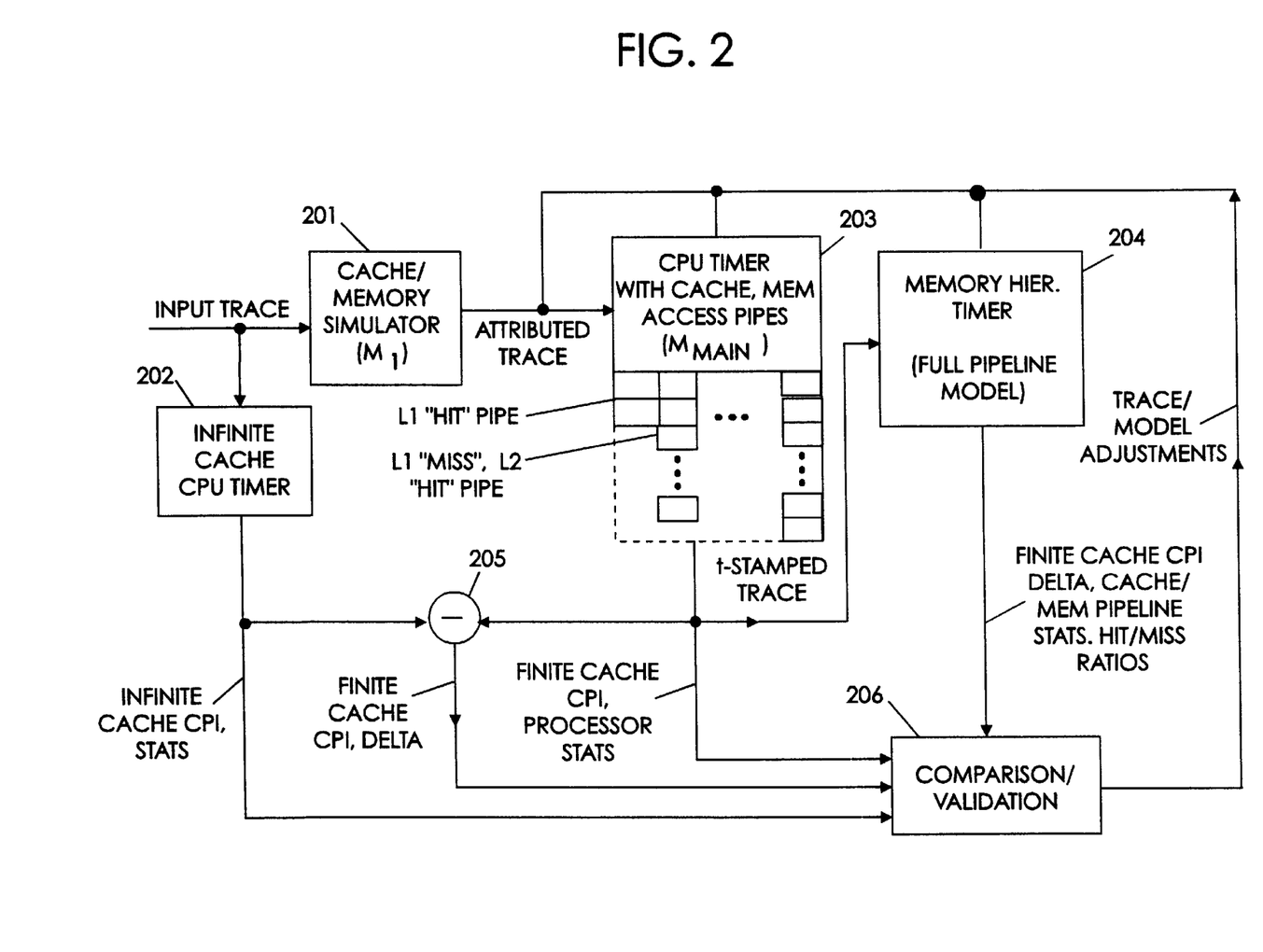
FIG. 2 illustrates a flow diagram of an embodiment of the present invention.

The overall steps of the procedure are illustrated by a block diagram illustrated in FIG. 2. Referring now to this figure, there is shown the original input instruction trace feeding a cache/memory hierarchy simulator 201, which is simulation sub-model $M_1$, and an "infinite cache" fully pipelined CPU timer 202. CPU timer 202 assumes that every reference to the on-chip cache is a "hit," and the cache access pipe is modeled as a conflict-free linear pipe of hit latency h, where typically h is 1–2 cycles, depending on the processor. The infinite cache timer 202 outputs program execution time (and hence CPI) prediction based on the perfect (infinite) cache assumption. The simulation sub-model $M_1$ 203 outputs a modified trace, in which each load and store (i.e., memory reference instruction) is "attributed" by a field (which is just a single bit in this example, because of a single level of cache hierarchy), which encodes the "hit/miss" value of that load/store, as predicted by $M_1$ 201. For example, an attribute of "1" may signify a "hit" and an attribute of "0" may signify a "miss" in this example. This modified trace (which is assumed to remain unchanged in total length, measured in bytes) as an "attributed" trace.

In FIG. 2, there is illustrated a series of linear cache/memory access pipes with the $M_{main}$ timer model 203. This shows the general case, where there exists a hierarchy of caches: level 1 (L1), level 2 (L2), etc. In the present example, these are simply two such access pipes: the L1 "hit" pipe of h cycles or stages and the L1 "miss" (i.e. MEM "hit") pipe of m cycles or stages (typically, m is much larger than h).

The $M_{main}$ timer model 203 outputs: (a) finite cache execution time (and hence CPI) estimates and (b) a "t-stamped" load-store instruction trace, which consists of load and store instructions only, which are time-stamped to indicate the cycles in which they were presented to the data cache or main memory, as predicted by the $M_{main}$ timer model 203. This t-stamped load-store trace forms an input to a standalone cache/memory pipelined timer model 204. This model, being a timer, is able to estimate the finite cache execution time (and hence the finite cache CPI delta over infinite cache performance) along with cache hit/miss statistics.

The subtractor box 205 computes the finite cache CPI delta from the infinite cache statistics (output of 202) and finite cache statistics (output of 203). The comparison/validation module 206 analyzes the various infinite and finite cache estimates and deltas generated by different models and tries to arrive at an acceptable, final range of CPI values, characterized by tight lower and upper bounds. If the range (difference between the upper and lower bounds) is unacceptably large, this would indicate error(s) in one or more model implementations, and the validation analysis could suggest corrections or adjustments to a particular model or the trace attribution or time-stamping process.

In the following description, the discussion elaborates further on the process of generating an attributed trace and a t-stamped trace, and sketches the basic cycle-simulation paradigm embodied in timer models such as 202, 203 or 204. The algorithm underlying the cache/memory hierarchy simulation model $M_1$ 201 is not described, since such algorithms are well known in the literature. Also, the description will not elaborate further the internals of the analysis algorithm or procedure used in the comparison/validation module 206 in this document, since it is not the central aspect of this invention, but only a side feature or benefit.

With continued reference to FIG. 2, note the speed and "validation-ease" of the described methodology as follows:

(a) The size/complexity and speed of the cache/memory access pipe-augmented infinite cache timer model is comparable to the base infinite cache model, since the overhead of doing the multi-level array/directory management and hit/miss logic simulation is not required. The size of the t-stamped (binary) trace is identical to the original instruction trace, since unused bits can be used for encoding the hit/miss descriptors.

(b) The process of trace attribution is a "one-time" pre-processing operation for a given memory hierarchy and workload, and it is fast, because a standard cache/memory simulator is used. The generated attributed trace can be stored and used repeatedly for many finite-cache processor trade-off studies, at low simulation cost.

(c) The t-stamped load/store trace generated by the CPU timer 203 can be independently (or concurrently) used by the standalone detailed cache/memory hierarchy timer 204. The t-stamped trace is very compact because it captures the memory access operations only. This trace is used to tune and validate the memory hierarchy timer model 204. (Note that the hit/miss cache/memory simulator 201 used is assumed to be fully accurate.)

Trace and timer model parameters may need to be iteratively adjusted, until acceptable margin of cross-validation is achieved.

Figure 3:
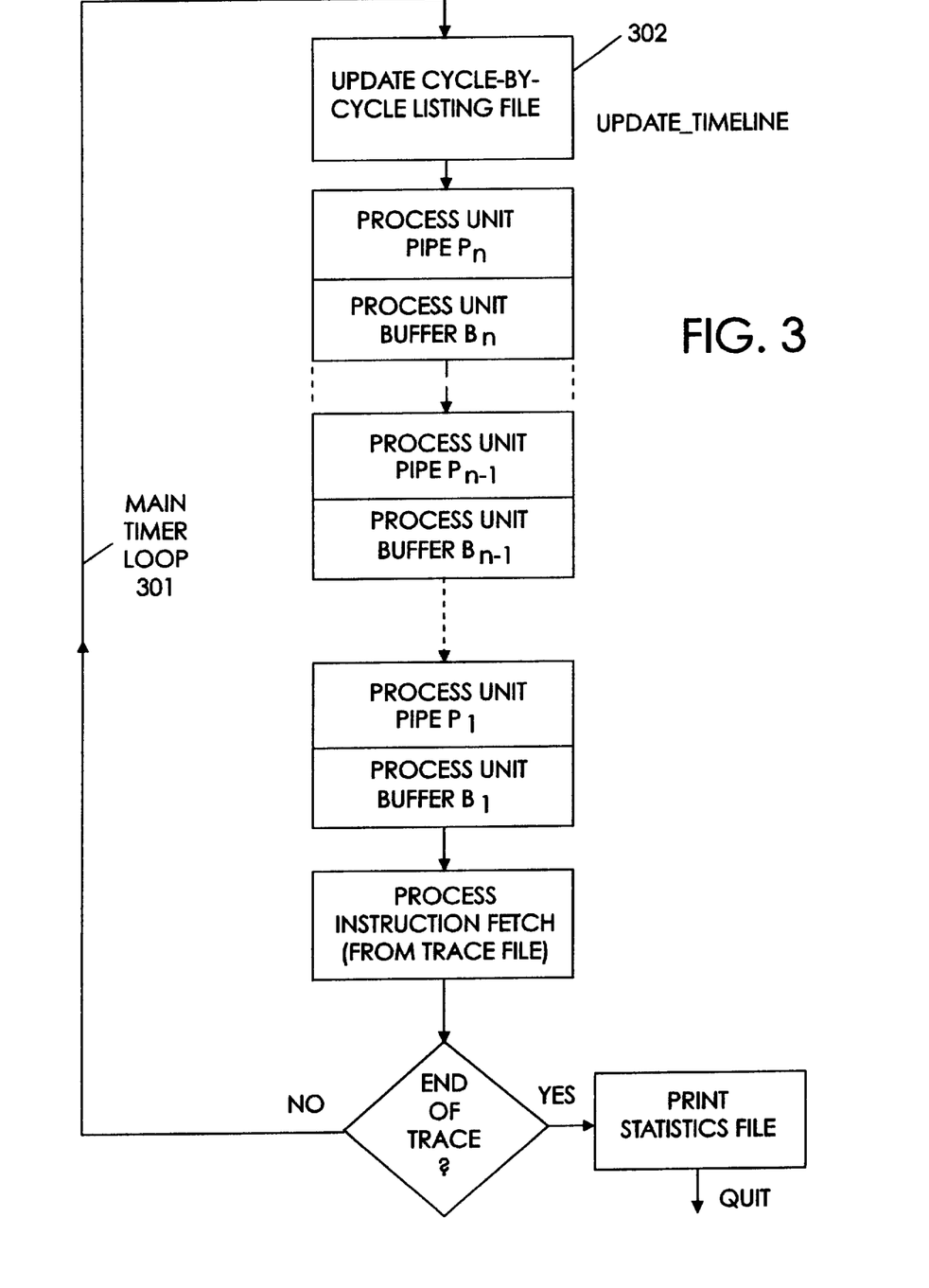

Referring next to FIG. 3, there is illustrated a flowchart describing the basic cycle simulation algorithm implemented in a generic processor/system timer program. Model specific variations are used, as required in the implementation of models 202, 203 and 204 referred to earlier in conjunction with the discussion related to FIG. 2. These specific variations are easily inferred from the generic description below, and are therefore not described separately. The generic timer model assumed in depicting the flowchart (FIG. 3) is a collection of n pipelined units, $P_1$ through $P_n$, each having an input queue/buffer $B_1$ through $B_n$ respectively. In specific implementations, for a given unit j ($1 \leq j \leq n$) either the pipe $P_j$ or its buffer $B_j$ may be absent; or in some cases, the buffer $B_j$ may be an output buffer, or be split into input and output buffers. As a generalized model, the entire timer model is visualized as a collection of such (pipe, buffer) entities.

The main cycle simulation loop is indicated in the flowchart (FIG. 3) by the directed flow edge 301. At the beginning of each cycle, the topmost box (UPDATE-TIMELINE 302) is entered; here, the timer program updates the cycle-by-cycle output listing, by dumping the state of each unit pipe and buffer to a designated disk file. Subsequently, the timer program services each of the n pipe/buffer pairs in sequence. Usually, the order of processing is in reverse order of activity, in terms of a typical set of instructions flowing through the model after being fetched from the trace file. Thus, if in the real processor, an instruction (or instruction group) fetched goes through units $(B_1, P_1), (B_2, P_2), \ldots, (B_n, P_n)$ in sequence, then the order of processing in the main timer loop 301 is $(P_n, B_n), (P_{n-1}, B_{n-1}), \ldots, (P_1, B_1)$.

If the processor has concurrent processing modes (as in super-scalar processors of the type shown in FIG. 1), then, in reality, an instruction packet may be split and processed concurrently in multiple units prior to completion. However, in the timer model, which is implemented in a sequential language (e.g., C or Pascal), the units are serviced in a fixed order, as shown. Since everything within a given machine cycle happens at the same time in the processor being modeled, the servicing order of the units within the main timer loop may be considered to be unimportant, on first sight. However, servicing the units in reverse order of a conceptual instruction flow path is needed to ensure conflict-free forward advancement of pipeline stage resources in the machine model.

Figure 4A:
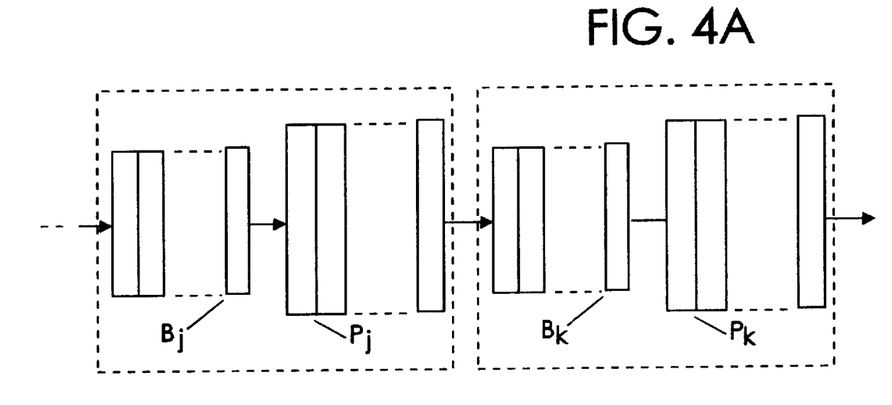
Figure 4B:
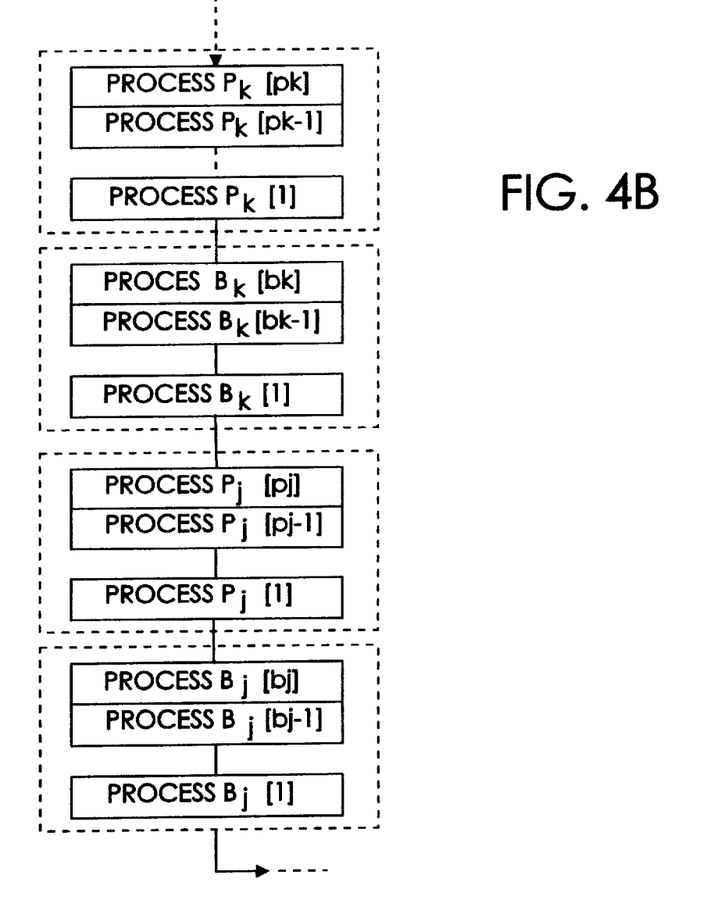

Referring next to FIG. 4, there is illustrated additional detail for the processing paradigm related to an individual buffer/pipe pair $(B_j, P_j)$ feeding another buffer/pipe pair $(B_k, P_k)$. FIG. 4(a) shows the selected hardware stage-chain, while FIG. 4(b) shows the pipeline/buffer stage processing sequence (in flowchart form) in the corresponding timer model segment. The buffers $B_j$ and $B_k$ are first-in-first-out (FIFO) queues of sizes $b_k$ and $b_k$ respectively. The (linear, feed-forward) pipe units $P_j$ and $P_k$ consist of $p_j$ and $p_k$ stages respectively. Following the rule of "reverse pipeline processing", in each cycle, the pipe/buffer stage-level order of servicing for the (j,k) buffer/pipe pair is: $P_k[Pk], P_k[Pk-1], \ldots, P_k[2], P_k[1], B_k[bk], B_k[bk-1], \ldots, B_k[2], B_k[1], P_j[pj], P_j[pj-1], \ldots P_j[2], P_j[1], B_j[bj], B_j[bj-1], \ldots, B_j[2], B_j[1]$. This ordering is indicated by the directed flowchart.

Figure 5:
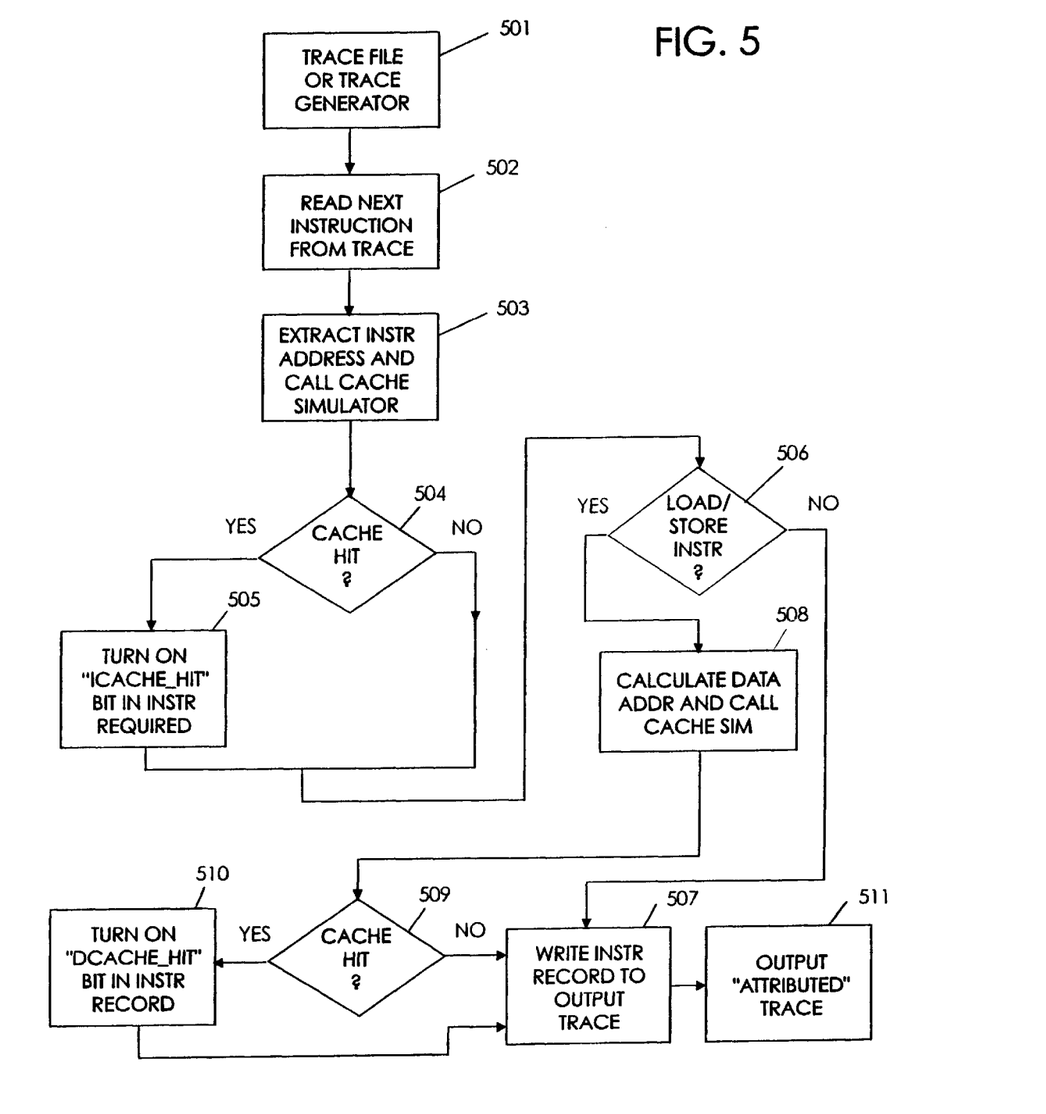

Referring next to FIG. 5, there is illustrated additional detail (in flowchart form) for describing the method of generating an "attributed" trace, referral to earlier in the context of FIG. 2. Each instruction address read (step 502) is presented to a cache simulator (step 503) to determine "hit" or "miss" (step 504). Similarly, if the instruction read from the trace (step 501) is a LOAD or STORE instruction (step 506, the corresponding data access address is presented to the cache simulator (step 508) to determine hit/miss (step 509). For instruction or data cache hits, "ITHIT" and "DHIT" bits (respectively) are turned "on" in the instruction record within the trace (steps 505 and 510). This modified instruction record becomes the next record (step 507) in the output "attributed" trace (step 511).

Figures 6, 6A:
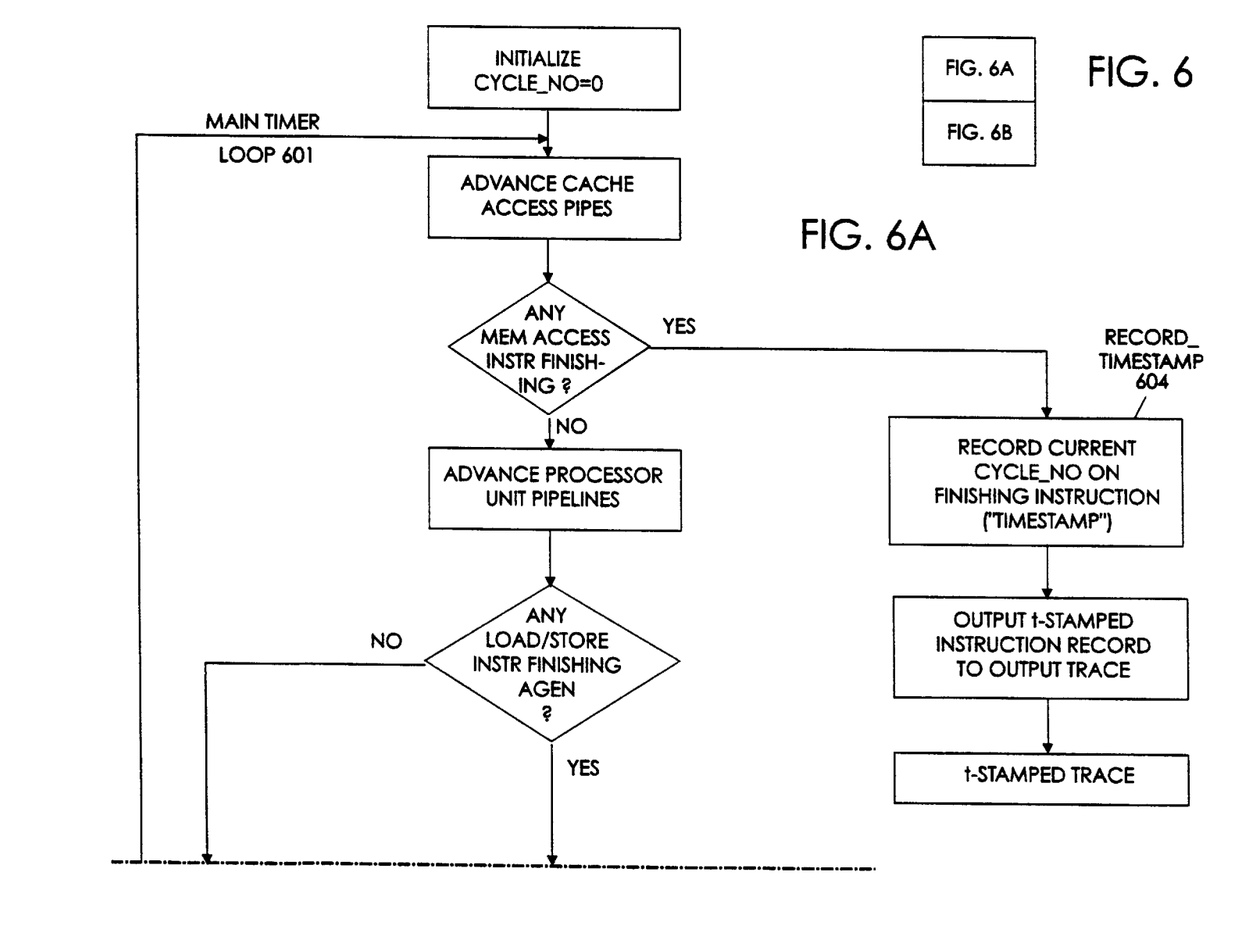
Figure 6B:
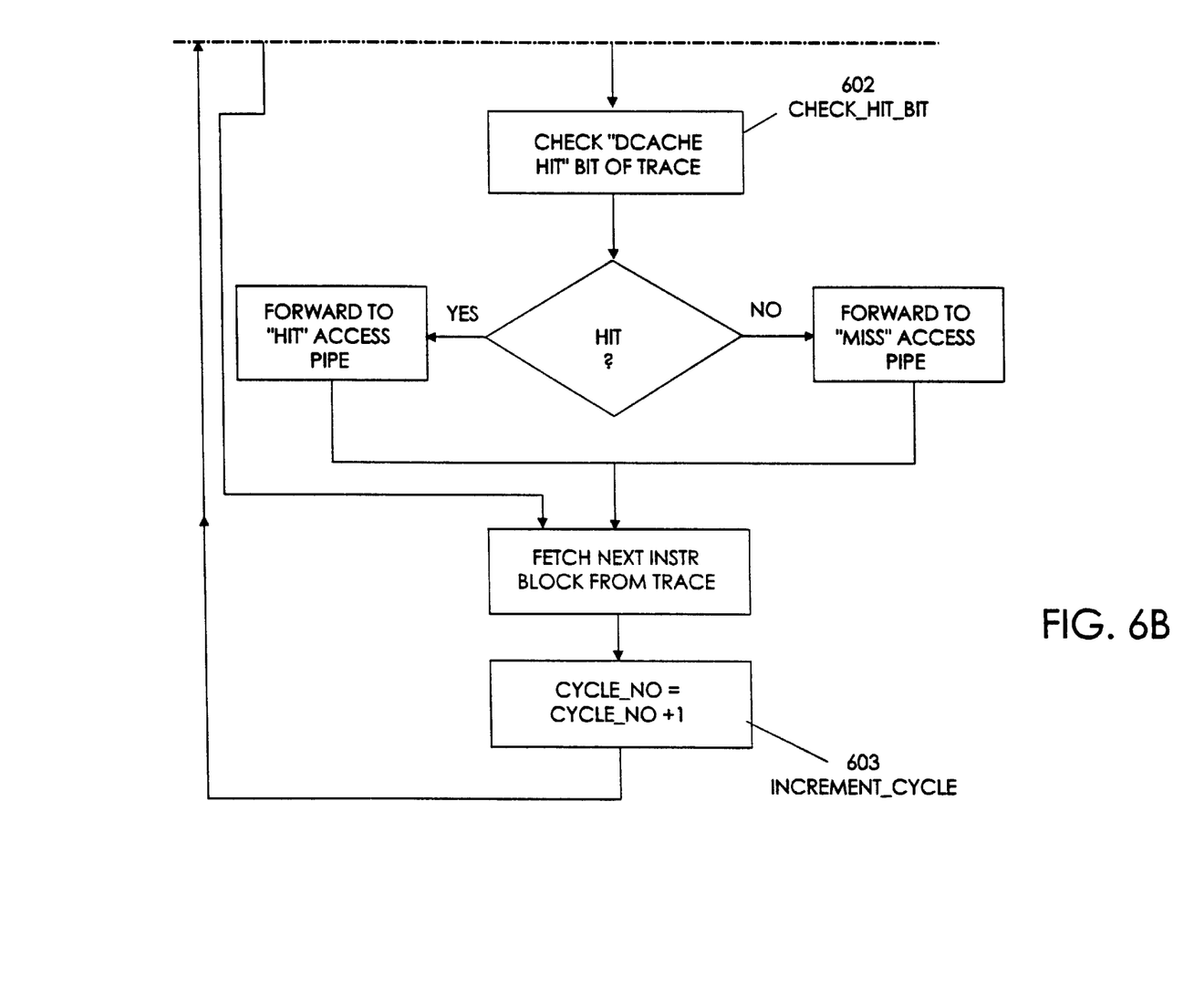

Referring next to FIG. 6, there is illustrated (in flowchart form) the method of generating a t-stamped trace," referred to earlier in the context of FIG. 2. The main timer loop 601 is basically the same loop (301) shown earlier to illustrate a cycle-by-cycle timer paradigm in FIG. 3. The main boxes of interest in FIG. 6 are: (A) CHECK_HIT_BIT 602, in which the "hit/miss" attribute bit of the instruction record is checked to see if the load/store is a cache hit or miss. Depending on the outcome, the corresponding cache access pipe (hit or miss) is accessed (in an ordinary timer, this hit/miss information has to be dynamically determined in the main timer loop for each load/store encountered, causing additional simulation cost); (B) INCREMENT_CYCLE 603, which causes the timer model to advance to the next machine simulation cycle; (C) RECORD_TIMESTAMP 604, in which the current cycle number (or "timestamp" is attached to or written into a finishing LOAD/STORE instruction.

The flowchart shown in FIG. 6 shows how the data cache (DCACHE) hit/miss information in the attributed trace is used in selecting the right access pipe. The instruction cache hit/miss information is not shown explicitly (for brevity) but the method is similar.

Although the present invention and its advantages have been described in detail, it should be understood that various changes, substitutions and alterations can be made herein without departing from the spirit and scope of the invention as defined by the appended claims.

What is claimed is:

1. A method for evaluating a performance of a processor coupled to a memory system, said method comprising the steps of:

processing an input trace in a memory system simulator to produce an attributed trace; and processing said attributed trace in a processor timer.

2. The method as recited in claim 1, wherein said memory system simulator is a non-pipelined simulator and wherein said processor timer is a pipelined model.

3. The method as recited in claim 1, wherein said step of processing said attributed trace produces a time-stamped trace.

4. The method as recited in claim 1, wherein said memory system includes at least one finite cache coupled to an infinite cache, wherein said attributed trace indicates cache hits and misses for each instruction.

5. The method as recited in claim 3, further comprising the step of:

processing said time-stamped trace in a memory hierarchy timer.

6. The method as recited in claim 1, further comprising the steps of:

processing said input trace in an infinite cache CPU timer; and comparing an output of said infinite cache CPU timer with an output of said processor timer.

7. A data processing system comprising:

a processor;

a memory system coupled to said processor;

means for processing an input trace in a memory system simulator to produce an attributed trace; and means for processing said attributed trace in a processor timer.

8. The system as recited in claim 7, wherein said memory system simulator is a non-pipelined simulator and wherein said processor timer is a pipelined model.

9. The system as recited in claim 8, wherein said processing means produces a time-stamped trace.

10. The system as recited in claim 7, wherein said memory system includes at least one finite cache coupled to an infinite cache, wherein said attributed trace indicates cache hits and misses for each instruction.

11. The system as recited in claim 9, further comprising:

means for processing said time-stamped trace in a memory hierarchy timer.

12. The system as recited in claim 9, further comprising:

means for processing said input trace in an infinite cache CPU timer; and means for comparing an output of said infinite cache CPU timer with an output of said processor timer.

13. A computer program product stored on storage media said computer program product comprising:

a plurality of program instructions for processing an input trace in a memory system simulator to produce an attributed trace; and a plurality of program instructions for processing said attributed trace in a processor timer.

14. The computer program product as recited in claim 13, wherein said memory system simulator is a non-pipelined simulator and wherein said processor timer is a pipelined model.

15. The computer program product as recited in claim 13, wherein said plurality of program instructions for processing produces a time-stamped trace.

16. The computer program product as recited in claim 13, wherein said memory system includes at least one finite cache coupled to an infinite cache, wherein said attributed trace indicates cache hits and misses for each instruction.

17. The computer program product as recited in claim 15, further comprising:

a plurality of program instructions for processing said time-stamped trace in a memory hierarchy timer.

18. The computer program product as recited in claim 13, further comprising:

a plurality of program instructions for processing said input trace in an infinite cache CPU timer; and a plurality of program instructions for comparing an output of said infinite cache CPU timer with an output of said processor timer.

* * * * *